H. SAGER.
NUT LOCK.
APPLICATION FILED SEPT. 1, 1915.

1,177,540.

Patented Mar. 28, 1916.
2 SHEETS—SHEET 1.

Inventor
Henry Sager

Witnesses

By Victor J. Evans
Attorney

H. SAGER.
NUT LOCK.
APPLICATION FILED SEPT. 1, 1915.

1,177,540.

Patented Mar. 28, 1916.
2 SHEETS—SHEET 2.

Inventor
Henry Sager

Witnesses

By Victor J. Evans
Attorney

UNITED STATES PATENT OFFICE.

HENRY SAGER, OF RAVENRUN, PENNSYLVANIA.

NUT-LOCK.

1,177,540.  Specification of Letters Patent.  Patented Mar. 28, 1916.

Application filed September 1, 1915. Serial No. 48,490.

*To all whom it may concern:*

Be it known that I, HENRY SAGER, a citizen of the United States, residing at Ravenrun, in the county of Schuylkill and State of Pennsylvania, have invented new and useful Improvements in Nut-Locks, of which the following is a specification.

This invention relates to improvements in nut locks.

The primary object of the invention is to provide a simple, expensive and effective nut lock capable of being readily applied to the nuts or to the heads of bolts engaging with the nuts for locking them against turning, and which may be readily removed when desired.

With the above and other objects in view, the improvement resides in the construction, combination and arrangement of parts set forth in the following specification and falling within the scope of the appended claims.

Figure 1:
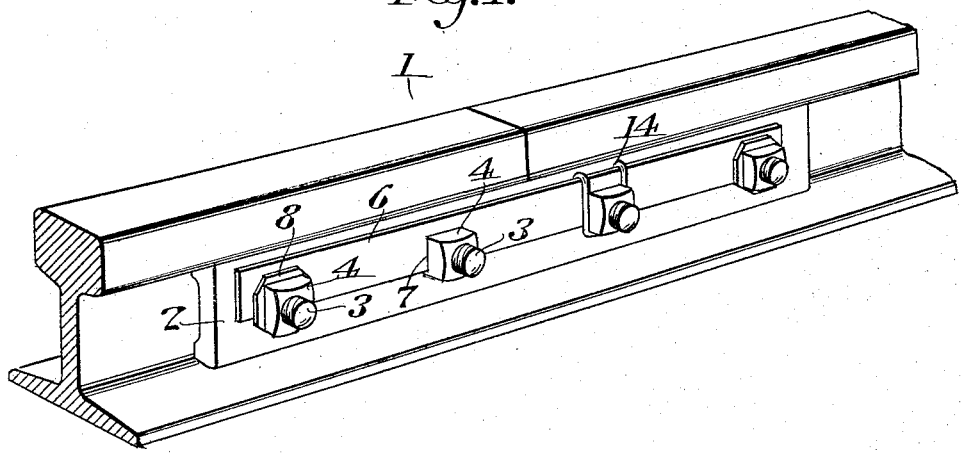
Figure 2:
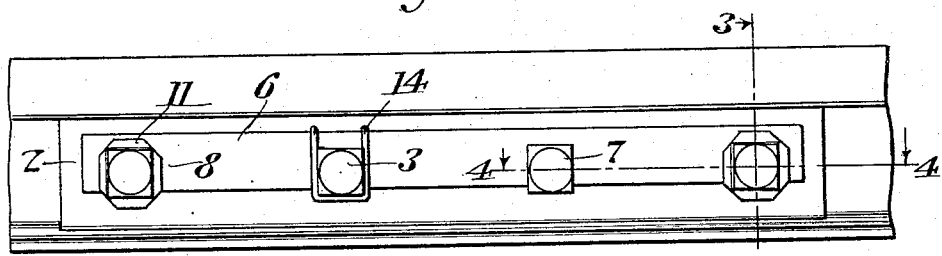
Figure 3:
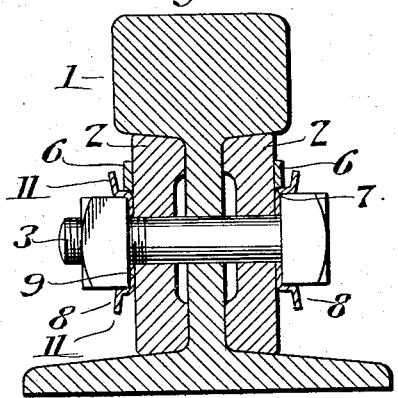
Figure 4:
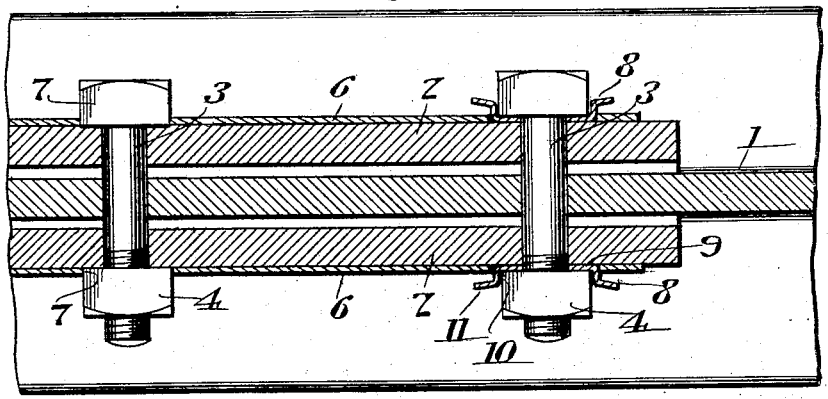
Figure 5:
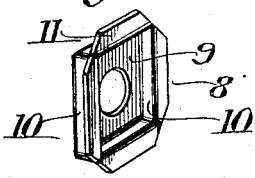
Figure 6:
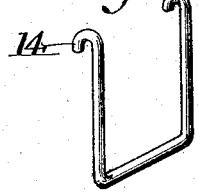
Figure 7:
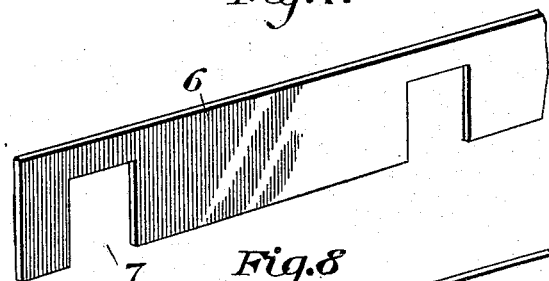
Figure 8:
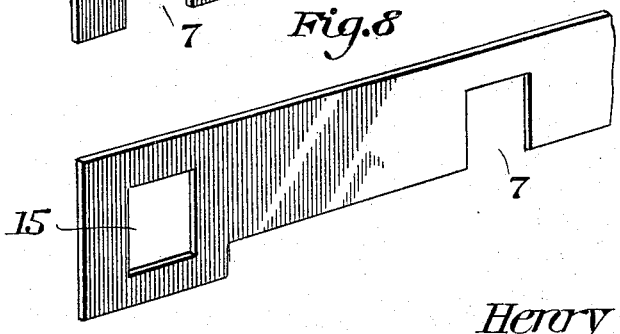

In the drawings: Figure 1 is a perspective view of a nut lock constructed in accordance with this invention, Fig. 2 is an elevation of the same looking toward the opposite side disclosed in Fig. 1, Fig. 3 is a transverse sectional view on the line 3—3 of Fig. 2, Fig. 4 is a horizontal sectional view on the line 4—4 of Fig. 2, Fig. 5 is a perspective view of one of the flanged caps or washers, Fig. 6 is a perspective view of the bail member which may be employed for preventing the vertical movement of the locking plate, Fig. 7 is a perspective view of the locking plate, and Fig. 8 is a similar view of a modified form of the locking plate.

While I have illustrated my invention in connection with a rail joint, it is to be understood that the same is not to be thus necessarily restricted in its useful capacity, as the same may be employed with equal efficiency upon structures connected by nuts and bolts which are subject to vibration.

In the drawings, the numerals 1 designate two railway rails, 2—2 the fish plates for connecting the rails, 3—3 the bolts passing through the fish plates and webs of the rails and 4—4 the nuts for the bolts.

Should the bolts be of a construction ordinarily employed in connecting two rails; that is, the said bolts at the juncture of their heads and shanks being provided with rectangular portions which engage between rectangular openings in one of the fish plates only one of the locking bars and the locking elements hereinafter described need be employed, but when common bolts are used the locking elements are employed upon both sides of the rail joint. For the sake of convenience, in the drawings I have illustrated a common form of bolt; that is, the class of bolts in which the rounded shanks connect directly with the heads, and therefore, upon each of the fish plates I use a locking bar which is indicated by the numeral 6. The locking bars comprise each a flat plate of a sufficient length and which is provided with spaced notches 7 entering from its lower edge, the number of notches corresponding with the number of nuts and bolts employed. The notches 7 are of a size to snugly receive the nuts in the heads of the bolts so that three of the said sides of the nuts or of the heads of the bolts will be contacted by two of the opposite as well as the upper wall of each of the notches.

Arranged upon the heads of the outer or end bolts as well as upon the end nuts are caps or washers indicated by the numerals 8. Each of these members 8 includes a flat body portion 9 having a central opening through which the shank of the bolt passes, the said body being substantially rectangular in plan and having its edges flanged to provide guide members 10 and the sides are also provided with outwardly extending flanges 11. Thus it will be noted that each of the members 8 provides a cup-shaped element and the head of the bolt and the nut are adapted to be received within the said cup-shaped portion, the flanges 11 projecting outwardly from the said nut and bolt. The distance between the flanges 11 and the body of the members 8 is less than the thickness of the heads of the bolts or the thickness of the nuts, so that the said members 8 will not interfere with the employment of a wrench or similar securing device.

The edges of the notches 7 in the plates 6 contact with the opposite sides of the substantially rectangular cap members or washers 8, the central notches engaging with the heads of the bolts and the nuts therefor, as previously described, and the plates 6 are sufficiently resilient to permit of the same being inserted over the central nuts and heads of the bolts and to be engaged by the outer flanges 11 of the members 8 when the plates are arranged to lock the nuts and bolts against unscrewing.

It will be obvious that the bolts are sustained against longitudinal as well as lateral movement by their engagement with the washers, but in order to prevent the vertical movement of the said plates I employ bail-shaped members provided with hooks 14 and insert the said bail-shaped members between the plates so as to bring the same into engagement with the sides and the underface of one of the nuts as well as into such engagement with the heads of one of the bolts. The hook ends 14 are then brought over the upper edges of the plates 6. If desired, however, each of the plates may be formed with an extension provided with a substantially rectangular opening 15, the said opening being disposed away from one of the end notches of said plate, and this opening may receive the head of one of the bolts, upon one side of the joint and the nut for the bolt upon the opposite side of the joint. This arrangement effectively prevents the vertical movement of the plates.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

1. In a nut lock, the combination with a superstructure, bolts passing through the same and nuts for the bolts, of dished rectangular members having outer flanges arranged on the nuts and on the heads of the bolts, a flat plate having notches extending from its lower edge and arranged over the dished members and connected by the flanges thereof, and means for securing the plate to the dished members.

2. In a nut lock, the combination with a rail joint, and bolts and nuts connecting the joint, of a dished substantially rectangular member upon certain of the nuts and upon the bolts engaged by such nuts, said members having their outer edges flanged, a resilient plate having its lower edge notched to engage with the flanged rectangular members and with the heads of the nuts and bolts intermediate the said rectangular members, and means for sustaining the plates against vertical movement upon the nuts and bolts.

In testimony whereof I affix my signature in presence of two witnesses.

HENRY SAGER.

Witnesses:
Louis Biltz,
M. T. Gillespie.